United States Patent [19]

Schonleitner

[11] Patent Number: 5,690,204
[45] Date of Patent: Nov. 25, 1997

[54] HYDRAULIC ACTUATOR AND CLUTCH THEREWITH

[75] Inventor: Anton Schonleitner, Steyr, Austria

[73] Assignee: Steyr-Daimler-Puch Aktiengesellschaft, Vienna, Austria

[21] Appl. No.: 627,026

[22] Filed: Apr. 3, 1996

[30] Foreign Application Priority Data

Apr. 26, 1995 [AT] Austria ................... 723/95

[51] Int. Cl.$^6$ .............. B60K 23/04; F16D 25/08
[52] U.S. Cl. .................. 192/85 C; 192/110 R; 91/431
[58] Field of Search ................ 192/85 C, 69.8, 192/86, 110 R; 475/86, 161, 237, 250; 91/431

[56] References Cited

U.S. PATENT DOCUMENTS

| | | | |
|---|---|---|---|
| 4,007,664 | 2/1977 | Popp | 91/431 X |
| 4,059,042 | 11/1977 | Bridwell et al. | 91/431 X |
| 4,703,671 | 11/1987 | Jikihara | 475/86 |
| 5,020,419 | 6/1991 | Amedei et al. | 475/86 X |
| 5,046,592 | 9/1991 | Mainquist et al. | 192/85 C X |

FOREIGN PATENT DOCUMENTS

| | | | |
|---|---|---|---|
| 1530883 | 6/1968 | France. | |
| 62-265035 | 11/1987 | Japan | 475/86 |
| 2-245401 | 10/1990 | Japan | 91/431 |
| 689688 | 4/1953 | United Kingdom. | |
| WO 82/01226 | 4/1982 | WIPO | 91/431 |

*Primary Examiner*—Richard M. Lorence
*Attorney, Agent, or Firm*—Bachman & LaPointe, P.C.

[57] ABSTRACT

A hydraulic actuator consists of a cylinder and a piston whose primary face is acted on by a working fluid and from whose secondary face protrudes a piston rod, the working fluid being furnished by a pressure fluid source. In order to allow for fast shifting at a precise point in time even at lowest ambient temperatures, a secondary circuit leads from the pressure fluid source via a changeover valve through channels in the wall of the cylinder and through the cylinder space to the secondary side of the piston, the changeover valve being selectively operated in order to allow working fluid to act on the primary side of the piston. By this secondary circuit, the actuator is kept at working temperature.

8 Claims, 1 Drawing Sheet

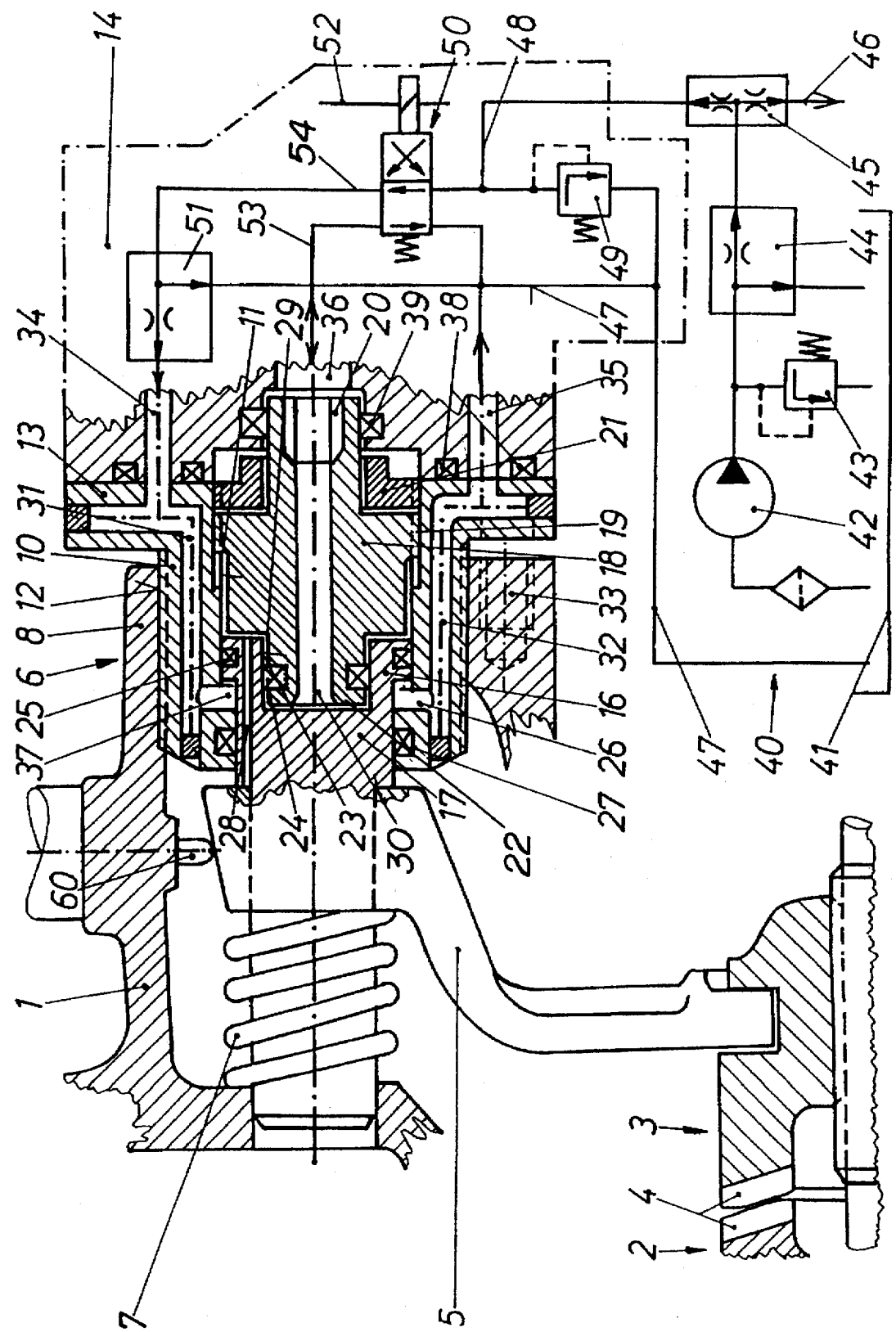

HYDRAULIC ACTUATOR AND CLUTCH THEREWITH

BACKGROUND OF THE INVENTION

The invention relates to a hydraulic actuator, consisting of a cylinder and a piston whose primary face is acted on by a working fluid and from whose secondary face protrudes a piston rod, the working fluid being furnished by a pressure fluid source. Hydraulic actuators of this kind are commonly in use in various designs in all kinds of machines and vehicles.

At the very low temperatures such hydraulic actuators are exposed to in service during severe winters or in arctic climate, the viscosity of hydraulic working fluids is so high that the operation of such actuators is impaired or even impossible. This is especially true when the hydraulic tubing and connections are exposed to ambient temperature. Impaired function renders impossible fast and precise shifting. Such shifting occurs when clutches for locking differentials are to be automatically operated depending on slip of the wheels. Examples of such clutches are described in U.S. Pat. No. 5,335,764 and U.S. patent application Ser. No. 08/385,313, now U.S. Pat. No. 5,573,096.

Accordingly, it is the principle object of the invention to propose an actuator of the described kind, that allows fast shifting at a precise point in time even at lowest ambient temperatures.

SUMMARY OF THE INVENTION

The foregoing object is achieved by the present invention wherein a secondary circuit leads from the pressure fluid source via a changeover valve through channels in the wall of the cylinder and through the cylinder space to the secondary side of the piston, the changeover valve being selectively operated in order to allow in one position the working fluid to act on the primary side of the piston for energizing the actuator and in a second position the working fluid to act on the secondary side of the piston.

The secondary circuit heats the actuator up or keeps it warm. Thanks to the changeover valve and thanks to the secondary circuit including the secondary side of the piston, the pressure source needs only to be dimensioned for one circuit rather than two and the stroke of the piston is not influenced by the secondary circuit.

The working fluid only circulates in the secondary circuit branching off at the changeover valve, when the piston is not acted on by the fluid of the primary circuit. But by this, it also circulates in the pipes from the central pressure fluid source to the actuator. By this constant flow, the working fluid is kept or brought to operating temperature, and therewith to normal viscosity. The fluid transfers heat to the cylinder and to the piston and also keeps the piping warm. When the changeover valve is operated again, back into the working position, the actuator responds immediately because the primary circuit is not drained, when the changeover valve is in heating position.

The inclusion of the secondary side of the piston into the secondary circuit has two advantages: First, the non-pressurized part of the system is used with the consequence that the fluid is circulated with little counter-pressure and with little power of the pump. Second, the piston rod is circumcirculated which increases the surface of heat transfer.

In a preferred embodiment of the invention, the piston has a coaxial cavity circumscribed by a cylindrical surface and extending into the piston rod. The cavity reduces the wall thickness of the piston and therewith the mass which has to be heated. It also reduces the bulk of the actuator.

This effect is increased, if a stop piece protrudes into the piston and into the cavity circumscribed by a cylindrical surface on the primary side of the piston, a seal being provided between the stop piece and the cylindrical surfaces. This enables the surfaces of the primary and the secondary faces of the piston to be made equal. Thanks to this, the hydraulic back pressures in the secondary circuit on the secondary faces and via the spill canal and the pressure channel on the primary face of the piston equalize each other. This helps avoiding unwanted operation of the actuator.

In an advantageous development of the invention, the axial position of the stop piece is adjustable. This makes the stroke of the piston adjustable. As the stop piece is accessible from outside during assembly, the adjustment needs only to be made after mounting the actuator. This lowers production cost, as machining with larger tolerances is possible.

Furthermore, it is advantageous to house the changeover valve together with further valves in a hydraulics block the latter closing the cylinder. Apart from the resulting simplification of the assembly, good heat transfer also on the other side of the piston is assured, because the flow divider valve bypasses part of the fluid of the secondary circuit to the return conduit (spill) along the cylinder on the primary side.

Finally, the actuator according to the invention is used to particular advantage in the casing of a lockable differential or of a transfer gearbox provided with a hydraulic actuator according to either of the preceding claims, the shifting fork of the coupling being rigidly connected with the piston rod.

BRIEF DESCRIPTION OF THE DRAWINGS

The invention will now be described with reference to the figure which is a schematic illustration of the hydraulic actuator of the present invention.

DETAILED DESCRIPTION

The casing 1 contains a dog clutch 2, whose axially shiftable coupling half 3 with frontal dogs 4 can be shifted into engagement by means of a shifting fork 5. In the shown embodiment, a spring 7 disengages the clutch when no torque is transmitted.

In the embodiment shown, the casing 1 is an axle casing, housing a differential gearbox (not shown) which can be locked by engaging the dog clutch 2, as known per se. The casing could also belong to any other gearbox (a transfer gearbox for instance), or any vehicle, or even a machine. The essential part of the invention is the actuator 6 to be described in detail, here mounted in the sleeve 8 of an axle casing 1.

The actuator comprises a hydraulic cylinder 10, screwed into the sleeve 8 in a position determined by the desired position of the stroke of a shifting fork 5 by means of the screw thread 12. The cylinder has an inner wall 11 and extends from the sleeve 8 in an outward direction and ends with a flange plate 13 to which is screwed the hydraulics block 14.

The length of the stroke is adjustable by adjusting a stop piece 18 inside the cylinder 10, and the position of the stroke by adjusting the position of the cylinder in the sleeve 8. For use with a frontal dog clutch, these adjustments need not be made until mounting of the actuator, which assures a good contact reflexation of the dogs and a minimum of dead stroke. The latter contributes to the desired fast engaging of the coupling.

Inside the cylinder 10, there is a piston 16 with an integral piston rod 17. The piston rod 17 leaves the cylinder 10, in the figure to the left, and carries the shifting fork 5. The primary side (working face) WF of the piston 16 is the side looking away from the piston rod 17; the secondary side is the side of the piston rod 17. The invention can be applied to a usual cylinder-piston-unit as described so far. The described embodiment shows further advantageous features.

On the primary side of the piston 16, stop piece 18 protrudes into the hydraulic cylinder 10. It is screwed into the hydraulic cylinder 10 by means of a screw thread 19 to a depth corresponding to the desired stroke. For this adjustment by screwing, it is provided with a hexagonal recess 20. Further, it is secured in the adjusted position with a fixation piece 21 in the manner of a lock nut. The primary side of the piston 16 has a recess 22 reaching into part of the piston rod 17, the recess being limited by a cylindric surface 23. Between this surface 23 and the stop piece 18 which protrudes into the recess 22, a primary seal 24 is provided, whose outer diameter determines the surface area on which the primary pressure which actuates the clutch acts. A secondary seal 25 is fixed on the outer circumference of the piston 16, providing sealing between the piston and the inner wall 11 of the hydraulic cylinder.

A secondary circular space 26 is created between the piston 16 and the lower end of the hydraulic cylinder 10 and further closed by a piston rod seal 27. A breather bore 28 is provided for ventilation of the space 29 between the two seals 24, 25. Inside the stop piece 18, there is a central pressure channel 30 leading from the hexagonal recess 20 to the recess 22, through which channel the pressure in the primary circuit acts into the recess 22.

A first and a second flushing channel 31, 32 is drilled into the wall of the hydraulic cylinder 10. Both channels 31, 32 communicate with the cylinder space 26 on the secondary side of piston 16 and with the hydraulic block 14. In the shown embodiment, the channels 31, 32 consist of a plurality of intersecting straight bores, in part provided with plugs, as determined by the shape of the cylinder. A circular channel 37 is machined into the inner wall 11 of the cylinder for enabling the secondary fluid to exit from the channels 31, 32 into the cylinder space 26.

The hydraulic block 14 has a first secondary bore 34, a second secondary bore 35 and a pressure bore 36. These are surrounded by O-rings 38, 39 which provide a tight connection for securing the hydraulic block 14 to the flange plate 13 and to the flange 8 of the axle housing by means of bolts 33. This connection can be modified at will, in order to accommodate special measures for adjusting the cylinder 10 in the axle housing for the purpose of adjusting the exact position of the stroke.

The hydraulic unit is supplied from a pressure oil source 40 which consists of a fluid reservoir 41, an oil pump 42, a first pressure relief valve 43, a first preferential flow valve 44 and a drain conduit 47. The pressure source 40 feeds pressure oil at the flow rate determined by the preferential flow valve 44 with the pressure determined by the pressure relief valve 43 to a proportional flow divider 45. From there, a predetermined portion of the oil is fed to the hydraulic block 14 through conduit 48 and the other portion through conduit 46 to some other actuator (for example for operating a further differential lock).

In the hydraulic block 14 is lodged a second pressure relief valve 49 and a changeover valve 50 which is a 4/2 solenoid valve. It is in flow-connection with the first secondary bore 34 and therewith with the first flushing channel 31 via a second preferential flow valve 51. Further, a conduit 53 leads from changeover valve 50 to the pressure channel 36 and therewith to the primary side of the piston. The changeover valve 50 is controlled via an electric lead 52. A further conduit 54 enables the oil to flow from the primary side of the piston to the drain conduit 47 when the changeover valve 50 is de-energized. A feeler 60 is provided for generating a feedback signal for the control unit (not shown) that operates the changeover valve 50.

The device works as follows: In the depicted position, the changeover valve 50 is de-energized and the actuator 6 is at rest. Consequently, the oil supplied by the pressure source 40 is directed by the changeover valve 50 to the secondary circuit, which keeps the actuator at working temperature. This assures a fast response of the actuator if it is energized sometimes later. For this purpose, the oil flows from the second preferential flow valve 51 via the first secondary bore 34 in the hydraulic block 14 and the first flushing channel 31 in the hydraulic cylinder 10 into the secondary annular space 26 and from there through the second flushing channel 32 back into the second secondary bore in the hydraulic block 14 and further back through the drain conduit 47 into reservoir 41.

With adequately chosen cross sections, a predetermined flow of oil at a high flow rate and with a relatively low pressure (corresponding to the pressure loss in the secondary circuit) will circulate in the secondary circuit. The power consumption of the pump is therefore also low.

If now the changeover valve 50 is energized for engaging the clutch, the secondary circuit is separated from the oil source and conduit 48 is connected to conduit 53. As no drain conduit is provided for this path, pressure will building up very fast in conduit 53 and in the pressure channel 30 on the primary side of the piston 16 and so move the preheated piston 16 in the likewise preheated cylinder 10. The secondary circuit is pressureless because it is in flow connection with the drain conduit 47.

As soon as the changeover valve is again de-energized, oil is again supplied to the secondary circuit, independent of the position of the shifting fork 5. In order to ensure this independence under all circumstances, the piston surface on the primary side and the piston surface on the secondary side can be chosen in a wide range thanks to the special design of the piston 16 and of the stop piece 18. When applied to the dog clutch which automatically opens when the transmitted torque falls below a level determined by the force of the spring 7, this means additionally that this spring-force can not be falsified by hydraulic influences.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hydraulic actuator comprising a cylinder; a piston mounted for axial movement within the cylinder, said piston having a primary face and a secondary face; a piston rod projecting from said secondary face; a fluid pressure source; conduit means including a changeover valve having a first position for selectively circulating working fluid from the fluid pressure source through said conduit means and a primary circuit to act on the primary face of the piston; and a secondary circuit for circulating working fluid from the fluid pressure source, through said conduit means and said changeover valve when in a second position to the secondary face of the piston, said secondary circuit includes a plurality of channels formed in a wall of the cylinder.

2. A hydraulic actuator according to claim 1, wherein said piston includes a cylindrical surface and the primary face of the piston includes a coaxial cavity defined in part by the cylindrical surface.

3. A hydraulic actuator according to claim 2, further including a stop piece within the cylinder wherein a portion of the stop piece is receivable in the coaxial cavity of the piston.

4. A hydraulic actuator according to claim 3, wherein a seal is provided between the stop piece and the cylindrical surface.

5. A hydraulic actuator according to claim 4, including means for adjusting the position of the stop piece within the cylinder.

6. A hydraulic actuator according to claim 1, wherein the changeover valve is located in a housing closing off the cylinder.

7. A hydraulic actuator according to claim 2, wherein the cylindrical surface extends into the piston rod.

8. Lockable differential gear having a clutch with a shiftable coupling half, a hydraulic actuator for operating said shiftable coupling half comprising a cylinder; a piston mounted for axial movement within the cylinder, said piston having a primary face and a secondary face; a piston rod projecting from said secondary face; a fluid pressure source; conduit means including a changeover valve having a first position for selectively circulating working fluid from the fluid pressure source through said conduit means and a primary circuit to act on the primary face of the piston; and a secondary circuit for circulating working fluid from the fluid pressure source, through said conduit means and said changeover valve when in a second position to the secondary face of the piston, said secondary circuit includes a plurality of channels formed in a wall of the cylinder.

\* \* \* \* \*